US005475781A

United States Patent [19]
Chang et al.

[11] Patent Number: 5,475,781
[45] Date of Patent: Dec. 12, 1995

[54] OPTICAL FIBER CONNECTOR ASSEMBLY WITH LOOP-BACK STRUCTURE

[76] Inventors: Peter C. Chang; Lujia Hwang; George Chou; I. Shun Lei, 930 W. Maude Ave., Sunnyvale, Calif. 94086

[21] Appl. No.: 306,755

[22] Filed: Sep. 15, 1994

[51] Int. Cl.$^6$ .................................................. G02B 6/36
[52] U.S. Cl. .................................................. 385/76
[58] Field of Search .................... 385/76, 56, 55, 385/59, 60, 76, 77, 78, 89, 139

[56] References Cited

U.S. PATENT DOCUMENTS

| 4,953,929 | 9/1990 | Basista et al. | 385/55 |
| 5,315,679 | 5/1994 | Baldwin et al. | 385/76 |
| 5,325,454 | 6/1994 | Rittle et al. | 385/76 |
| 5,343,547 | 8/1994 | Palecek et al. | 385/76 |

Primary Examiner—Rodney B. Bovernick
Assistant Examiner—John Ngo

[57] ABSTRACT

An optical fiber connector assembly (70) includes a duplex clip (30) having two cavities (32) and two standard SC type connectors (10) side-by-side received therein wherein one connector (10) inter-mates with an optical emitter and the other connector inter-mates with an optical detector. A loop-back optical fiber (20) is generally positioned in the rear exterior of the duplex clip (30) with two distal ends of the fiber being respectively connected to the rear ends of the corresponding two connectors (10) inside such duplex clip. A back shield (40) fixedly encloses the duplex clip (30) from the back wherein such back shield (40) further includes a rearwardly projection hermetic portion whose shape conforms to the configuration of such loop-back fiber (20) for protection. Also, for protection, two caps (48) can be optionally respectively attached to the front portions of the connectors (10) extending forwardly from the clip (30).

1 Claim, 2 Drawing Sheets

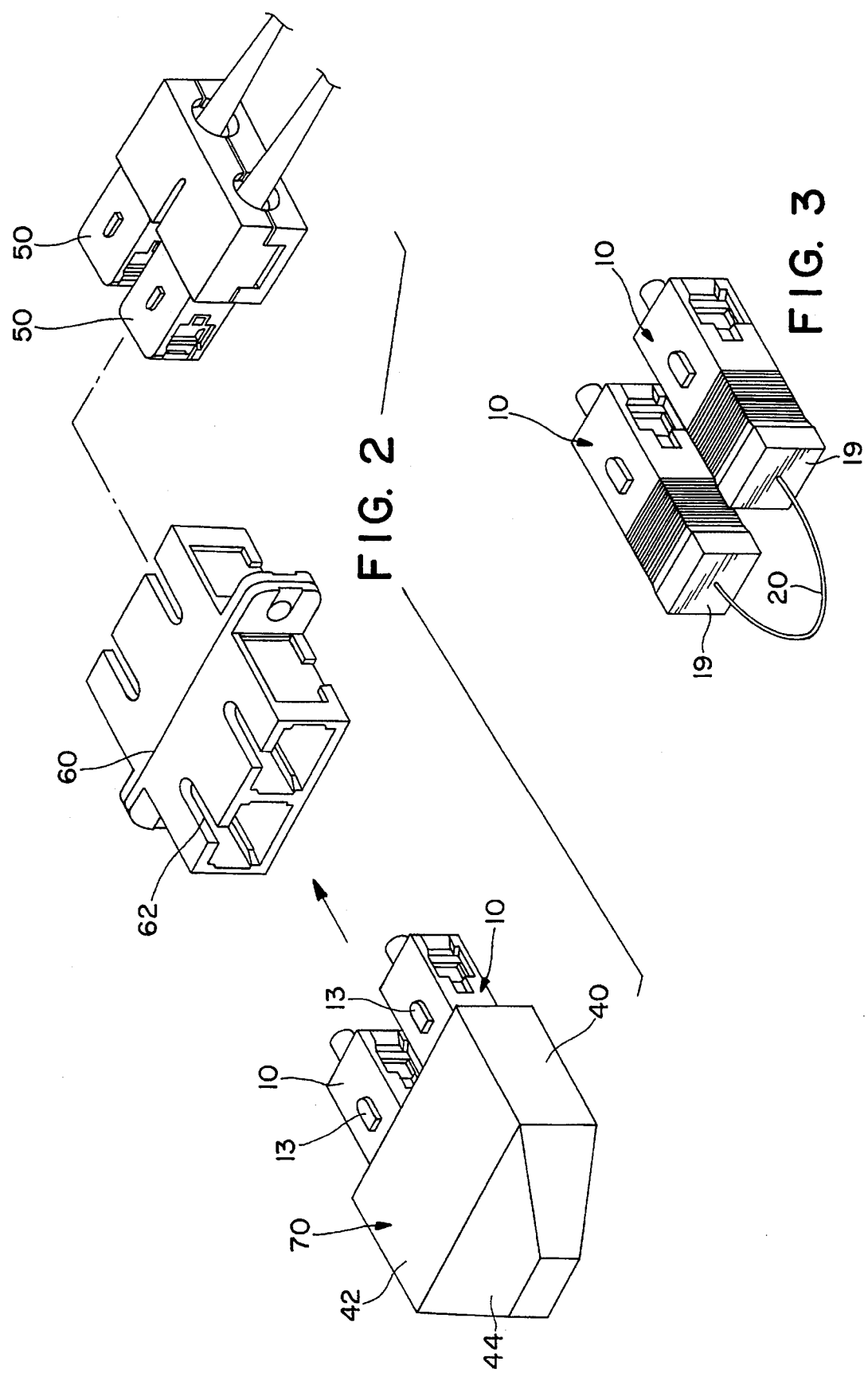

OPTICAL FIBER CONNECTOR ASSEMBLY WITH LOOP-BACK STRUCTURE

BACKGROUND OF THE INVENTION

1. Field of The Invention

The invention relates to optical fiber connector assemblies, particularly to two SC type optical fiber connectors arranged in a parallel relationship to each other with an optical fiber connected between two rear ends of such two optical fiber connectors, respectively, so that such two SC type optical fiber connectors are formed as one unit for simulation or attenuation in an optical fiber system.

2. The Prior Art

Optical fiber communication system is gradually used in the recent industry. Various optical fiber connectors have been applied to such system for connection between optical fibers, and such connectors include the ST type (as shown in U.S. Pat. No. 5,139,133 and 5,293,582), the FDDI type (as shown in U.S. Pat. No. 5,202,949 and 5,289,554), and the SC type (as shown in U.S. Pat. No. 5,212,752 and 5,233,674). Recently, the SC type connector becomes more popular due to its compact size in comparison with the FDDI type, and its easy push-pull operation in comparison with the ST type which requires rotation operation.

It is also noted that optical fiber system is applied in a form of network system where plural local area network systems are integrally connected with each other and the whole system is so intricate and complex. Because it is impossible to use an overall operation test to find out a minor malfunctioning spot in the whole huge system, it is required to apply a loop-back arrangement to a designated segregated position in such system for self-testing a specific region thereof to check where such malfunction comes from. Additionally, sometimes a terminator device may be installed onto an end position of such system for forming a signal loop and not interrupting signal transmission thereof if such end position of the whole system is in an open status and no sub-assembly is connected thereto. Moreover, in a certain situation, an attenuator or filter is required to installed onto a specific position in the whole system for moderation of the signal transmission.

It is well known that some FDDI type connectors have been designedly reformed to be in a form of loop-back attenuator or filter for achieving aforementioned purposes in an optical fiber communication system, for example, U.S. Pat. Nos. 4,736,100, 4,952,798, 4,979,793, 4,982,083 and 5,039,456. It is also noted that even though the SC type connector becomes more and more popular as aforementioned, there is no loop-back SC type connector assembly in the market. Understandably, the reason of such deficiency may be that it is easier to form a loop-back FDDI connector by using an optical fiber to connect two parallel optical ferrules in the housing thereof because the FDDI type connector is inherently composed of a duplex ferrule structure and a huge housing to receive such pair of ferrules therein, but oppositely, the SC type connector is generally of a simplex ferrule type installed within a compact housing which may require to associate with another simplex SC type connector to form a duplex connector assembly thereof for achieving the loop-back operation.

It is also noted that many attempts have been taken to combine two simplex SC type connectors together to form a duplex connector assembly for mating with a complementary duplex connector assembly for consideration of singal's in-and-out, for example, U.S. Pat. Nos. 4,953,929, 5,123, 071, 5,268,982, 5,293,581, 5,315,679, 5,329,604 and 5,343,547.

Therefore, an object of the invention is to provide a connector assembly which not only accommodates two standard simplex SC type connectors therein, but also offers a loop-back function for functioning as an attenuator or simulator.

SUMMARY OF THE INVENTION

According to an aspect of the invention, an optical fiber connector assembly includes a duplex clip having two cavities and two standard SC type connectors received therein wherein one connector inter-mates with an optical emitter and the other connector inter-mates with an optical detector. A loop-back optical fiber is generally positioned in the rear exterior of the duplex clip with two distal ends of the fiber being respectively connected to the rear ends of the corresponding two connectors inside such duplex clip. A back shield fixedly encloses the duplex clip from the back wherein such back shield further includes a rearwardly projection hermetic portion whose shape conforms to the configuration of such loop-back fiber for protection. Also, two caps can be optionally attached to the front portions of the connectors extending forwardly from the clip for protection.

BRIEF DESCRIPTION OF THE DRAWINGS

FIG. 2 is a perspective view of the assembled optical fiber connector assembly of FIG. 1 and another pair of complementary connectors, and an adaptor for receiving the connectors.

FIG. 3 is another embodiment of the SC type optical fiber connector using a plate to shield the rear end thereof for prevention of material invasion during a insert molding process in a later time.

DETAILED DESCRIPTION OF THE PREFERRED EMBODIMENT

Figure 1:
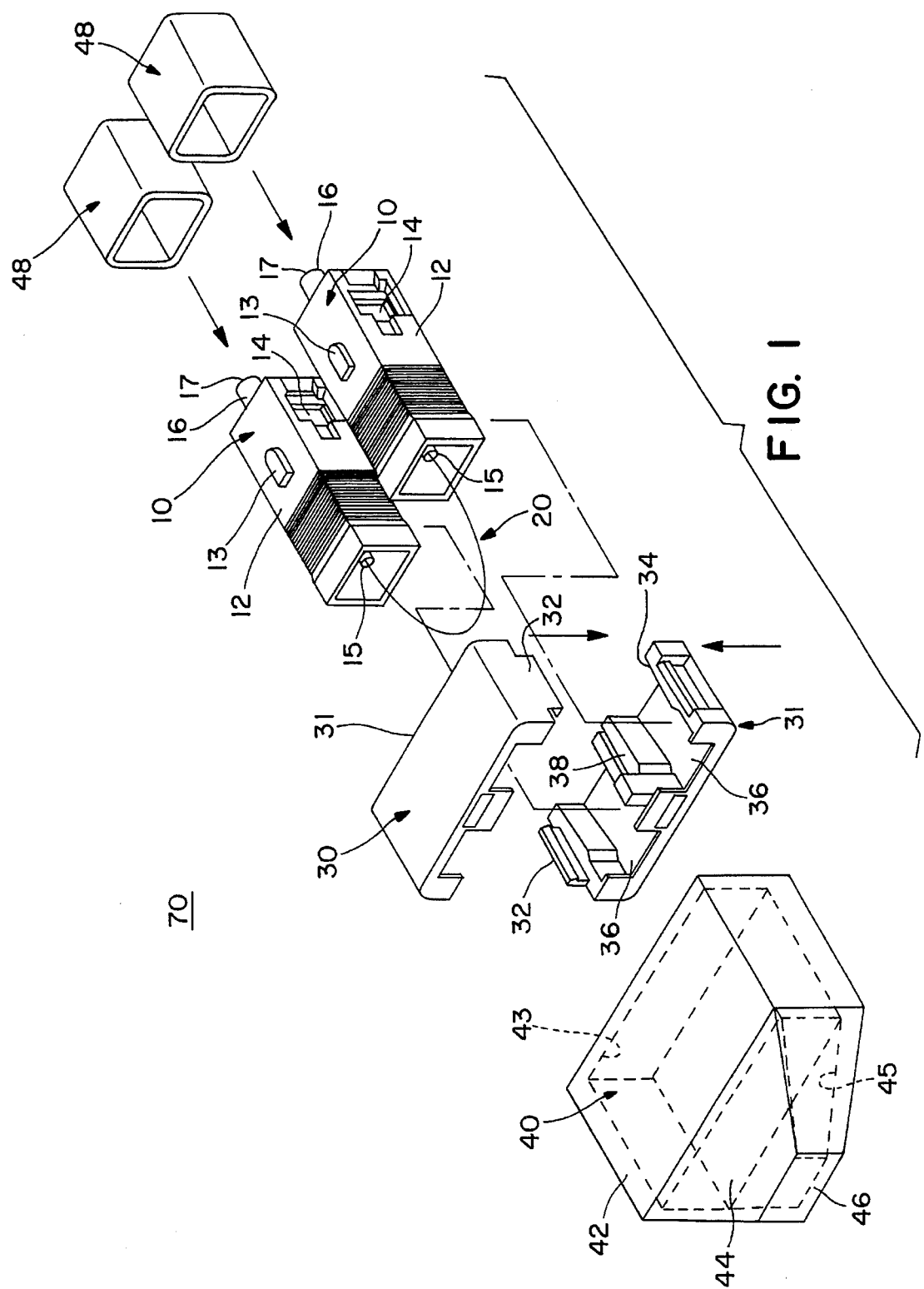
FIG. 1 is an exploded perspective view of an optical fiber connector assembly of a presently preferred embodiment according to the present invention.

References will now be made in detail to the preferred embodiments of the invention. While the present invention has been described with reference to a specific embodiment, the description is illustrative of the invention and is not to be construed as limiting the invention. Various modifications to the present invention can be made to the preferred embodiment by those skilled in the art without departing from the true spirit and scope of the invention as defined by appended claims.

It will be noted here that for a better understanding, like components are designated by like reference numerals throughout the various figures in the embodiment. Attention is now directed to FIGS. 1 and 2 wherein two, (i.e., the first and the second), SC type optical fiber connectors 10 are juxtaposed with each other in a duplex clip 30. Each connector 10 includes a hollow outer housing 12 to receive therein an inner housing 14 which is adapted to be axially movable with regard to the outer housing 12. A tubular housing 15 is fixedly received within the rear portion of the inner housing 14, and a ceramic ferrule 16 is coaxially moveable in the tubular housing 15 wherein the front end 17 of the ferrule 16 protrudes out of the inner housing 14 and the outer housing 12. A key 13 is disposed on one surface of the outer housing 12 for polarization during mating.

The basic standard structure of such SC type connector 10 can be referred to U.S. Pat. No. 5,287,425 having the same inventor with this application. The difference between the common SC type optical fiber connector and the SC type connector 10 used in this invention, is that a bare optical fiber 20 is configured to be a U-shape wherein two opposite ends thereof are securely and insertably received within the ferrule 16 from the back. Thus these two connectors 10 substantially form a loop-back manner.

These two independent connectors 10 can be assembled as one piece by a two-half duplex clip 30. Such duplex clip 30 is composed of two half covers 32 each including a hook section 32 and an indent section 34, so that the two half covers 31 can be fastened with each other. Two cavities 36 are formed in the clip 30 for receiving the two side-by-side connectors 10 therein, respectively, wherein the shape and the dimension of each cavity 36 conforms to those of the corresponding connector 10 so that such two connectors 10 can be properly retained within the corresponding cavity 36 as one set without axial or lateral movement when sandwiched by the two half covers 31. The detailed structure of such clip 30 may be referred to a previous patent application of Ser. No. 08/118,117 now being allowed, entitled "Duplex Clip For Optical Fiber Connector Assembly" (Chang et al.), filed Sep. 8, 1993, having the same inventors with this application.

It can be seen that when these two connectors 10 are side by side positioned within the clip 30, the right connector 10 is substantially segregated from the left one by the intermediate partition walls 38 of the clip 30, thus assuring independence of each connector 10 for avoiding improper mutual force transmission between these two connectors 10 when this set connector assembly, i.e., two connectors 10, is mating with another pair of complementary optical fiber connectors 50 through an adaptor 60 as shown in FIG. 2. It can be appreciated that the front portions of the connectors 10 designedly protrude forwardly out of the clip 30 for adaptation of insertion into the adaptor 60 to mate the complementary connectors 50.

A hollow back shield 40 designedly attachably covers the clip 3 from the back. The shield 40 includes a rectangular portion 42 and a pyramid-like portion 44 wherein the front surface of the rectangular portion 42 is open and the vertex section of the pyramid-like portion is truncated by substitution of an end plate 46 to form a close end. Similar to the exterior shape, the back shield 40 includes a rectangular cavity 43 in the rectangular portion 42 for reception of the clip 30 therein, and a pyramid-like cavity 45 in the pyramid-like portion 44 for reception of the U-shaped bare fiber 20 therein.

A cap 48 can be optionally loaded onto the front portion of the connector 10 which is exposed out of the clip 30, for protection.

Referring to FIG. 2, when assembled, each connector 10 first is itself assembled under the condition that the bare fiber 20 is simultaneously secured, through its two opposite ends, within the ferrules 16 of the connectors 10. Then, these two connectors 10 are loaded into the bottom half cover 32 from the top, and later the top half cover 32 is fastened to the bottom half cover 32 by means of the hook sections 32 and the indent sections 34. Thus, the two connectors 10 are juxtaposed within the clip 30 with the U-shaped bare fiber disposed in an exterior with regard to the clip 10. The back shield 40 encloses the clip 10 from the back with adhesion positioned between the external surfaces of the clip 10 and the interior surfaces of the back shield 40. The front edges of the back shield 40 are generally flush with the front edges of the clip 30, and the clip 30 and the back shield 40 are fixed together by such adhesive. The assembled connector assembly 70 including the two juxtaposed connectors 10 with one connected fiber 20, the duplex clip 30 and the back shield 40, can be coupled to the adaptor 60 with the keys 13 aligned within the corresponding slots 62 for mating the complementary connectors 50 in the adaptor 60 wherein one complementary connector 50 functions as a transmitter end (or emitter) and the other one as a receiver end (or detector). Therefore, such connector assembly 70 can be applied as a simulator, an attenuator or a terminator.

It can be understood that the bare fiber 20 is completely and safely shielded in the whole connector assembly 70 for prevention of external affects, such that the liability of the connector assembly is assured. The two connectors 10 are juxtaposed with each other in a predetermined distance in the clip for coupling to the adaptor 60, but each connector 10 is independent from the other. The components, e.g., the parts of the connector 10, in this invention, are commonly used with the standard SC type connector, so that it is not necessary to make another mold for manufacturing, thus saving money. It is also noted that in an alternative embodiment, the process of high frequency sealing may be used to replace the adhesive therein. Additionally, the insert molding process also can be used to replace the adhesive therein. In such situation and as shown in FIG. 3, the rear end of the connector 10 may be shielded by a plate 19 with the bare fiber 20 extending therethrough for consideration of sealing, and the back shield 40 are directly mounted onto the clip 30 by the insert molding process. In this situation, the back shield 40 can also be securely combined with the clip 30 and its associated connectors 10 without any adhesive. Moreover, by accurately maintaining the connectors 10 in place with some specific tools, the clip 30 may be omitted in this connector assembly and the back shield 40 may be directly attached onto and cover such two parallel positioned connectors 10 to form a unitary set.

While the present invention has been described with reference to a specific embodiment, the description is illustrative of the invention and is not to be construed as limiting the invention. Various modifications to the present invention can be made to the preferred embodiments by those skilled in the art without departing from the true spirit and scope of the invention as defined by the appended claims.

Therefore, persons of ordinary skill in this field are to understand that all such equivalent structures are to be included within the scope of the following claims.

What is claimed is:

1. An optical fiber connector assembly comprising:

two standard SC type connectors (10) juxtaposed with each other, each standard SC type connector (10) including a hollow outer housing (12) to receive therein an inner housing (14) which is adapted to be axially movable with regard to the outer housing (12);

a tubular housing (15) fixedly received within a rear portion of the inner housing (14) and a ceramic ferrule (16) coaxially moveable in the tubular housing (15) wherein a front end (17) of the ferrule protrudes out of the inner housing (14) and the outer housing (12);

a U-shaped bare optical fiber (20) connected between two ends of said two standard SC type connectors (10) to form a loop-back;

a duplex clip (30) being composed of two half covers (31) each including a hook section (32) and an indent section (34) for fastening with each other;

two cavities (36) being formed in the clip (30) for side by side receiving said two standard SC type connectors (10) therein wherein each cavity (36) conforms to the outer housing (12) of the standard SC type connector (10) so that said two standard SC type connectors (10) can be properly retained within the corresponding cavity (36) without axial or lateral movement;

a hollow back shield (40) protectively attached to the clip (30) from the back, said shield (40) including a rectangular portion (42) and a pyramid-like portion (44) whereby the rectangular portion (42) defines a rectangular cavity (43) for substantially fully enclosing the clip (30) and the pyramid-like portion (44) defines a pyramid-like cavity (45) for reception of said U-shaped bare optical fiber (20) therein.

* * * * *